US011242662B2

(12) United States Patent
Babcock

(10) Patent No.: US 11,242,662 B2
(45) Date of Patent: Feb. 8, 2022

(54) CONCRETE SEAWALL WITH PRECAST COMPONENTS

(71) Applicant: INSIDE BET LLC, Eden, UT (US)

(72) Inventor: John W. Babcock, Eden, UT (US)

(73) Assignee: Inside Bet, LLC, Eden, UT (US)

( * ) Notice: Subject to any disclaimer, the term of this patent is extended or adjusted under 35 U.S.C. 154(b) by 0 days.

(21) Appl. No.: 17/199,225

(22) Filed: Mar. 11, 2021

(65) Prior Publication Data

US 2021/0285174 A1 Sep. 16, 2021

Related U.S. Application Data

(60) Provisional application No. 62/988,308, filed on Mar. 11, 2020.

(51) Int. Cl.
| | | |
|---|---|---|
| *E02B 3/06* | (2006.01) | |
| *E02D 29/02* | (2006.01) | |
| *E02D 5/03* | (2006.01) | |
| *E02D 27/32* | (2006.01) | |

(52) U.S. Cl.
CPC .................. *E02B 3/06* (2013.01); *E02D 5/03* (2013.01); *E02D 27/32* (2013.01); *E02D 29/0266* (2013.01); *E02D 2250/0023* (2013.01); *E02D 2300/002* (2013.01); *E02D 2600/30* (2013.01)

(58) Field of Classification Search
CPC .......... E02D 29/0266; E02D 2300/002; E02D 2600/30; E02D 5/03; E02B 3/06; E02B 3/066; E02B 3/04
See application file for complete search history.

(56) References Cited

U.S. PATENT DOCUMENTS

| | | | | | |
|---|---|---|---|---|---|
| 4,244,665 | A | * | 1/1981 | Neumann | E01F 8/021 405/286 |
| 4,426,176 | A | * | 1/1984 | Terada | E02D 29/025 405/285 |
| 4,572,711 | A | * | 2/1986 | Benson | E02D 29/0266 405/273 |
| 4,592,678 | A | * | 6/1986 | McNinch, Jr. | E02D 29/025 405/229 |
| 4,666,334 | A | * | 5/1987 | Karaus | E02B 11/00 405/31 |
| 4,668,129 | A | * | 5/1987 | Babcock | E02D 29/0266 405/284 |
| 5,468,098 | A | * | 11/1995 | Babcock | E02D 29/0225 405/262 |

(Continued)

*Primary Examiner* — Carib A Oquendo
(74) *Attorney, Agent, or Firm* — Kunzler Bean & Adamson; Bruce R. Needham

(57) ABSTRACT

Seawalls and methods for making seawalls are disclosed. A seawall may include a concrete footing, with a first plurality of anchorages disposed in the concrete footing. A plurality of precast concrete tee beams may include single-tee beams and/or double-tee beams. Flanges of the tee beams may be positioned to form seaward and landward faces of the wall, and stems of the tee beams may be coupled to the footing between the seaward and landward faces. A second plurality of anchorages may be disposed at tops of the stems. Elongate steel components extend through the stems, and are tensioned between the first plurality of anchorages and the second plurality of anchorages. Interior fill may be disposed between the seaward and landward faces. One or more wave deflectors may be disposed above the tee beams.

20 Claims, 9 Drawing Sheets

(56) References Cited

U.S. PATENT DOCUMENTS

| | | | | |
|---|---|---|---|---|
| 5,492,438 A | * | 2/1996 | Hilfiker | E02D 29/0241 |
| | | | | 405/285 |
| 2003/0185634 A1 | * | 10/2003 | Babcock | E02D 5/80 |
| | | | | 405/284 |
| 2007/0253784 A1 | * | 11/2007 | Harrison, Jr. | E02B 3/06 |
| | | | | 405/285 |
| 2014/0270990 A1 | * | 9/2014 | Heraty | E02D 29/0266 |
| | | | | 405/286 |
| 2016/0333544 A1 | * | 11/2016 | Babcock | E04C 5/07 |

* cited by examiner

CONCRETE SEAWALL WITH PRECAST COMPONENTS

CROSS-REFERENCES TO RELATED APPLICATIONS

This application claims the benefit of U.S. Provisional Patent Application No. 62/988,308 entitled "CONCRETE SEAWALL WITH PRECAST COMPONENTS" and filed on Mar. 11, 2020 for me: John W. Babcock, which is incorporated herein by reference.

FIELD

This invention relates to concrete seawalls and more particularly relates to concrete seawalls with precast components.

BACKGROUND

Seawalls may provide from erosion and/or flooding of a coastline. Similar structures may be used at saltwater or freshwater shorelines, riverbanks, or the like, as dikes or levees. Cast-in-place concrete seawalls may provide long-lasting coastline protection, but may be time-consuming or expensive to build.

SUMMARY

A seawall, in various embodiments, includes a concrete footing. In some embodiments, a seawall includes a plurality of precast concrete tee beams, including single-tee beams and/or double-tee beams. In some embodiments, flanges of the tee beams are positioned to form seaward and landward faces of the wall, and stems of the tee beams are coupled to the footing between the seaward and landward faces. In some embodiments, a seawall includes interior fill disposed between the seaward and landward faces.

A method for making a seawall, in various embodiments, includes excavating a location for placing a concrete footing for a wall. In some embodiments, a method includes installing a sheet pile wall extending downward from the location. In some embodiments, a method includes installing a concrete footing at the location. The concrete footing may include a first plurality of anchorages for threadbars. In some embodiments, a method includes coupling threadbars to the anchorages. In some embodiments, a method includes placing a plurality of precast concrete tee beams over the threadbars. The tee beams may include single-tee beams and/or double-tee beams. The tee beams may be positioned so that the threadbars extend through stems of the tee beams, and the flanges of the tee beams are positioned to form seaward and landward faces of the wall. In some embodiments, a method includes coupling a second plurality of anchorages to the threadbars above the stems of the tee beams. In some embodiments, a method includes tensioning the threadbars between the first plurality of anchorages and the second plurality of anchorages. In some embodiments, a method includes installing interior fill between the seaward and landward faces.

A seawall, in some embodiments, includes a concrete footing. In some embodiments, a first plurality of anchorages is disposed in the concrete footing. In some embodiments, a seawall includes a plurality of precast concrete tee beams, including single-tee beams and/or double-tee beams. In some embodiments, flanges of the tee beams are positioned to form seaward and landward faces of the wall, and stems of the tee beams are coupled to the footing between the seaward and landward faces. In some embodiments, a second plurality of anchorages is disposed at tops of the stems. In some embodiments, elongate steel components extend through the stems, and are tensioned between the first plurality of anchorages and the second plurality of anchorages. In some embodiments, interior fill is disposed between the seaward and landward faces. In some embodiments, one or more wave deflectors are disposed above the tee beams.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
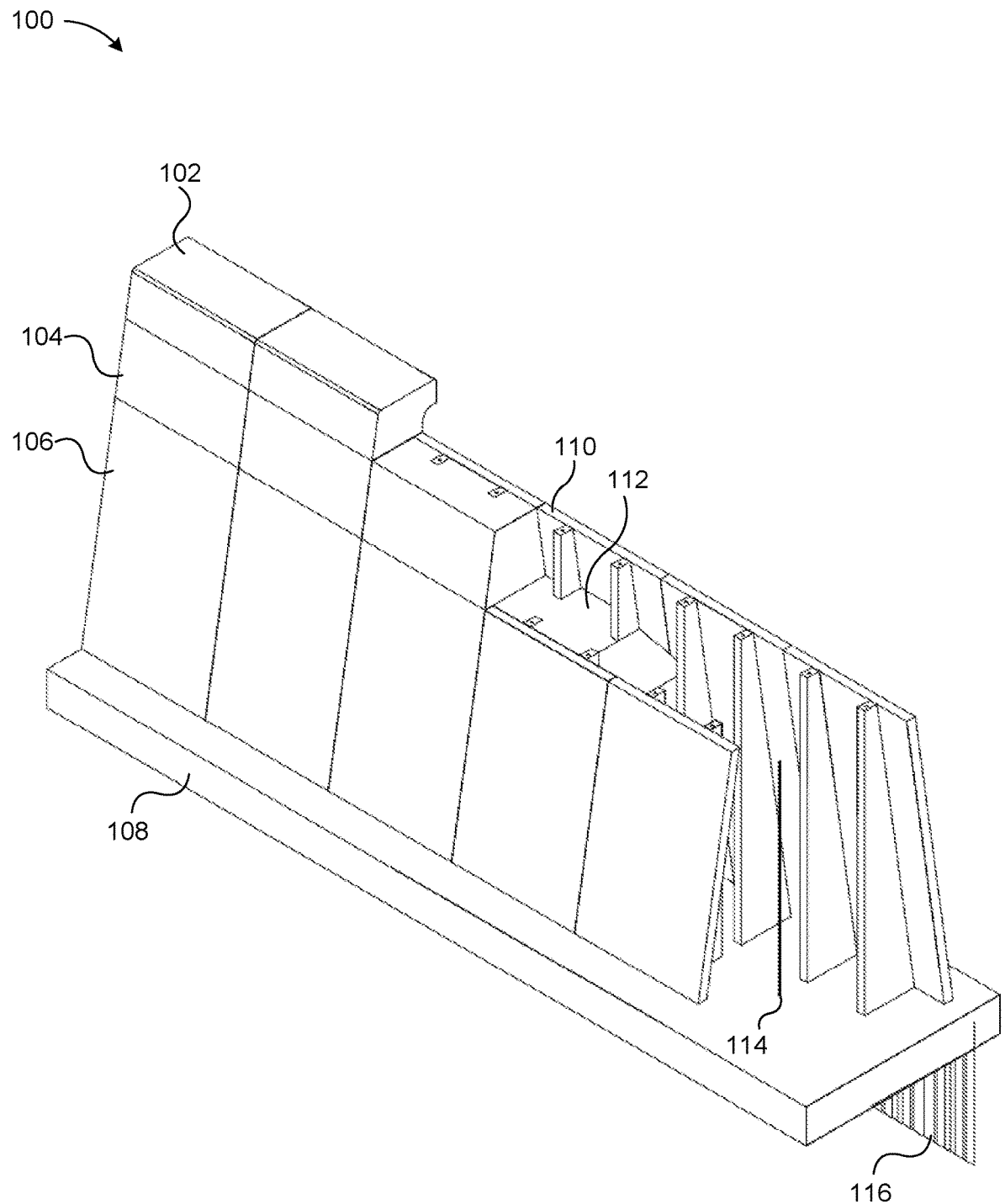
FIG. 1 is a perspective view illustrating one embodiment of a seawall under construction.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A seawall, in various embodiments, includes a concrete footing. In some embodiments, a seawall includes a plurality of precast concrete tee beams, including single-tee beams and/or double-tee beams. In some embodiments, flanges of the tee beams are positioned to form seaward and landward faces of the wall, and stems of the tee beams are coupled to the footing between the seaward and landward faces. In some embodiments, a seawall includes interior fill disposed between the seaward and landward faces.

In some embodiments, the flanges of the tee beams are positioned so that the seaward and landward faces of the wall are slanted and the wall is thicker at a base of the wall than at a top of the wall. In some embodiments, the stems of the tee beams extend further away from the flanges of the tee beams at the base of the wall than at the top of the wall.

In some embodiments, a first plurality of anchorages is disposed in the concrete footing, and a second plurality of anchorages is disposed at tops of the stems. In some embodiments, elongate steel components extend through the stems, and are tensioned between the first plurality of anchorages and the second plurality of anchorages. In some embodiments, the elongate steel components include threadbar. In some embodiments, the elongate steel components comprise multi-wire steel strand.

In some embodiments, one or more wave deflectors are disposed above the tee beams. Wave deflectors may include concrete that is shaped to deflect water. In some embodiments, the tee beams forming the landward face of the wall are shorter than the tee beams forming the seaward face of the wall. In some embodiments, an upper portion of the wall is disposed above the tee beams forming the landward face of the wall, and behind the tee beams forming the seaward face of the wall. In some embodiments, the upper portion of the wall includes cast-in-place concrete. In some embodiments, the tee beams forming the landward face of the wall are equal in height to the tee beams forming the seaward face of the wall.

In some embodiments, the interior fill includes cast-in-place concrete and/or vibration-compacted crushed rock. In some embodiments, a sheet pile wall extends downward from the footing to prevent erosion of soil under the footing. In some embodiments, the footing includes cast-in-place concrete. In some embodiments, the footing includes concrete tee beams. In some embodiments, a plurality of drains extend through the wall, and are sloped to drain water from a landward side to the seaward side. In some embodiments, the plurality of drains may include at least one upper drain that includes an inlet disposed above a soil level at the landward face of the wall. In some embodiments, the plurality of drains may include at least one lower drain that includes a filtered inlet disposed below the soil level.

A method for making a seawall, in various embodiments, includes excavating a location for placing a concrete footing for a wall. In some embodiments, a method includes installing a sheet pile wall extending downward from the location. In some embodiments, a method includes installing a concrete footing at the location. The concrete footing may include a first plurality of anchorages for threadbars. In some embodiments, a method includes coupling threadbars to the anchorages. In some embodiments, a method includes placing a plurality of precast concrete tee beams over the threadbars. The tee beams may include single-tee beams and/or double-tee beams. The tee beams may be positioned so that the threadbars extend through stems of the tee beams, and the flanges of the tee beams are positioned to form seaward and landward faces of the wall. In some embodiments, a method includes coupling a second plurality of anchorages to the threadbars above the stems of the tee beams. In some embodiments, a method includes tensioning the threadbars between the first plurality of anchorages and the second plurality of anchorages. In some embodiments, a method includes installing interior fill between the seaward and landward faces.

In some embodiments, a method further includes comprising disposing a plurality of drains extending through the interior fill between the seaward and landward faces. In some embodiments, a method further includes coupling one or more wave deflectors to the wall above the tee beams.

A seawall, in some embodiments, includes a concrete footing. In some embodiments, a first plurality of anchorages is disposed in the concrete footing. In some embodiments, a seawall includes a plurality of precast concrete tee beams, including single-tee beams and/or double-tee beams. In some embodiments, flanges of the tee beams are positioned to form seaward and landward faces of the wall, and stems of the tee beams are coupled to the footing between the seaward and landward faces. In some embodiments, a second plurality of anchorages is disposed at tops of the stems. In some embodiments, elongate steel components extend through the stems, and are tensioned between the first plurality of anchorages and the second plurality of anchorages. In some embodiments, interior fill is disposed between the seaward and landward faces. In some embodiments, one or more wave deflectors are disposed above the tee beams.

FIG. 1 depicts one embodiment of a seawall 100 under construction. The seawall 100 is depicted in a perspective view, with a seaward side to the upper right, and a landward side to the lower left. The seawall 100 is depicted under construction, with different portions of the wall 100 at different stages of construction, so that certain internal components of the seawall 100 are visible. Terms such as "seawall," "seaward," and "landward" are used herein to refer, generally, to structures that provide erosion protection and/or flooding protection where water meets land. Thus, in one embodiment, a "seawall" as disclosed herein may be a levee along a riverbank, and may nevertheless be referred to herein as a "seawall" with a "seaward" side and a "landward" side, despite the freshwater context. Similarly, a wall providing erosion protection in a protected area like a harbor may be referred to as a "seawall" despite the lack of direct exposure to the sea. In the depicted embodiment, the seawall 100 includes wave deflectors 102, a cast-in-place upper portion 104, landward tee beams 106, a footing 108, seaward tee beams 110, interior fill 112, threadbar 114, and a sheet pile cut-off wall 116, which are described below.

The sheet pile cut-off wall 116 is disposed at the base of the seawall 100, and extends downward from the footing 108 to prevent erosion of soil under the footing 108. A sheet pile wall 116, in various embodiments, may include interlocking (or otherwise connected) sheet piles, which may be driven into the ground by a vibratory hammer, hydraulic press, or the like, or may be placed in an excavation such as a narrow trench and grouted for stability. Various types of sheet pile walls 116 or methods of constructing a sheet pile wall 116 may be used with various embodiments of a seawall 100, to prevent water seepage and soil erosion under the wall 100.

In some embodiments, a sheet pile wall 116 may be omitted, and the problems associated with water seepage and soil erosion under the wall 100 may be solved in another way. For example, a ditch may be excavated downward from the location where the footing 108 will be installed, and may be filled with concrete that is then coupled to the footing 108, so that the concrete-filled ditch prevents water seepage and soil erosion under the wall. In various embodiments of a wall 100, various other or further structures for preventing water seepage and/or soil erosion under the wall 100 may be used in place of a sheet pile wall 116.

In some embodiments, a location may be excavated for placing a concrete footing 108 for a wall 100. For example, at a shoreline where a seawall is to be installed, a shallow cut or trench may be excavated to provide a level location where the footing 108 of the wall 100 may be disposed. (Crushed rock may also be installed into such an excavation as a base for the footing 108 in some embodiments, and the landward side of the excavation may be backfilled after construction of the wall 100.) When a location is excavated for placing a concrete footing 108, a sheet pile wall 116 may be installed extending downward from that location, and the footing 108 may then be installed at that location.

The footing 108, in various embodiments, provides a foundation for other components of the wall 100. In the depicted embodiment, the footing 108 is cast-in-place concrete. In another embodiment, the footing 108 may be formed from precast concrete sections. In some embodiments, the footing 108 is coupled to the sheet pile cut-off wall 116. For example, sheet pile cut-off wall 116 may be installed so that upper portions of sheet piles extend up from the soil. A cast-in-place concrete footing 108 may cast so that concrete is contact with or surrounding the exposed portions of the sheet piles. Alternatively, precast concrete sections for a footing 108 may include a void shaped to engage or surround the exposed portions of the sheet piles.

In various embodiments, the exterior of the wall 100 is formed of concrete tee beams 106, 110. Although the term "tee beam" is sometimes used to refer specifically to a single-tee beam with a T-shaped cross section, terms such as "tee beam" or "tee" are used herein to refer to more generally to a single-tee beam, a double-tee beam with a TT-shaped cross section, a triple-tee beam and/or another multi-tee beam. For a single-tee beam with a T-shaped cross-section, a stem or web corresponds to the stem of the T, and a flange corresponds to the crossbar of the T. Similarly, for a double-tee beam with a TT-shaped cross-section, a flange corresponds to a crossbar across the top of both Ts, and two stems or webs correspond to the stems of the two Ts. In the depicted embodiment, the tee beams 106, 110 are double-tee beams. In another embodiment, the tee beams 106, 110 may be single-tee beams, a mixture of single-tee and double-tee beams, or the like.

In various embodiments, tee beams 106, 110 may be precast concrete. In various embodiments, precast concrete components may be cast using reusable molds, forms, or beds, then moved (as solid components) to the locations where they will be installed, coupled together, and/or coupled to other components. By contrast, some concrete components that are not precast may be cast in place by building casting forms on site and pouring concrete into the forms to cure and remain in place. However, building forms for casting concrete in place may be time-consuming, expensive, or difficult to do in a location that is exposed to waves from the sea. Thus, in some embodiments, the use of precast concrete tee beams 106, 110 may allow a wall 100 to be built more quickly and at lower cost than a cast-in-place wall.

In the depicted embodiment, the flanges of tee beams 106, 110 are positioned to form the seaward and landward faces of the wall 100, and the stems of the tee beams 106, 110 are coupled to the footing 108 between the faces (e.g., in the interior of the wall 100). In the depicted embodiment, the flanges of tee beams 106, 110 are positioned so that the seaward and landward faces of the wall 100 are slanted, and the wall 100 is thicker at the base than at the top. Accordingly, in further embodiments, the stems of the tee beams 106, 110 may extend further away from the flanges at the base of the wall 100 than at the top. Thus, the stems are slanted relative to the flanges (or, equivalently, the flanges are slanted relative to the stems). The result is that when the tee beams 106, 110 are installed with the stems vertical, at the interior of the wall 100, the flanges form slanted seaward and landward faces of the wall 100. A casting bed for casting standard concrete single-tee or double-tee beams may be modified to have slanted portions for casting single-tee or double-tee beams with slanted stems.

Various types of precast concrete beams may be post-tensioned by casting a sleeve or duct into the concrete along the length of the beam, inserting post-tensioning steel (such as multi-wire steel strand or steel threadbar) through the sleeve or duct, and tensioning the post-tensioning steel between anchorages at either end of the beam. The sleeve or ducts may be pressure-grouted so that the tensioned steel is bonded to the surrounding grout. Alternatively, grouting may be omitted, so that the tensioned steel (e.g., threadbar or multi-wire strand) within a sleeve or duct is not bonded to surrounding grout or concrete along its length between anchorages. At the anchorages, tension in the steel is transmitted to (and balanced by) compression in the concrete. The resulting compression of the concrete strengthens it against tensile forces that will occur when the beam is used.

In various embodiments, post-tensioning steel for a wall 100 may include a plurality of elongate steel components that extend through stems of the tee beams 106, 110. Elongate steel components for post-tensioning may be threadbar, multi-wire steel strand or the like. In some embodiments, components for post-tensioning may be made of materials other than steel. For example, fiberglass, carbon fiber, or other synthetic material may be used to form elongate components for post-tensioning. Sleeves or ducts to receive the elongate steel components may be cast into the precast concrete tee beams 106, 110, and the steel may be subsequently inserted into the sleeve or duct. Alternatively, the elongate steel components for post-tensioning may be cast into the precast concrete tee beams 106, 110, but separated from the concrete by a sleeve, duct, spiral wrap, or the like, so that the post-tensioning steel does not bond to the concrete, allowing the post-tensioning steel to be subsequently tensioned between two anchorages.

In the depicted embodiment, tee beams 106, 110 include sleeves or ducts for post-tensioning steel along the length of the stems. By disposing one set of anchorages for the post-tensioning steel in the footing 108 and another set of anchorages for the post-tensioning steel at the top of the stems, the post-tensioning steel may be used for the dual purpose of compressing and strengthening the tee beams 106, 110 and coupling the tee beams 106, 110 to the footing 108. Various further subject matter relating to walls and/or to coupling and post-tensioning concrete components, is included in U.S. patent application Ser. No. 17/187,402 entitled "STRAND-TO-THREADBAR COUPLER BLOCK FOR PRESTRESSED CONCRETE" and filed on Feb. 26, 2021 for John W. Babcock, which is incorporated herein by reference.

In the depicted embodiment, the post-tensioning steel is threadbar 114. Threadbar 114, in various embodiments, may include a steel bar that is fully threaded, threaded at ends but smooth along the length to prevent bonding to concrete, or the like. Threads allow threadbar 114 to be tensioned by applying torque to threadbar nuts at anchorages. Various types of threadbar 114, or other forms of post-tensioning steel such as multi-wire strand, will be recognized as suitable for prestressing or compressing concrete in a seawall 100. To construct the wall 100, the sheet pile cut-off wall 116 and the footing 108 are placed, threadbars 114 are coupled to anchorages in the footing 108, and tee beams 106, 110 are placed on or over the threadbars 114. Tee beams 106, 110 may include ducts or sleeves for threadbars 114, and may be placed by lifting the tee beams 106, 110 above the threadbars 114, then lowering the tee beams 106, 110 so that the ducts or sleeves surround the threadbars 114. Assembly of components may take place in another order. For example, threadbars 114 may be inserted into ducts or sleeves in tee beams 106, 110, then moved into place and torqued to anchorages in the footing 108.

In the depicted embodiment, interior fill 112 is disposed between the seaward and landward faces of the wall 100, (e.g., between inward facing surfaces of the tee beams 106, 110). In one embodiment, interior fill 112 may be cast-in-place concrete. In another embodiment, interior fill 112 may be ballast. In another embodiment, interior fill 112 may be crushed rock (e.g., gravel) compacted by vibration to form a solid wall interior. For example, interior fill 112 may be three-quarter inch minus fill, compacted by vibration. Interior fill 112 may be installed between the seaward and landward faces of the wall 100, after the tee beams 106, 110 are coupled to the footing 108, and may then be cast, compacted or the like.

In some embodiments, a seawall 100 may be built so that the seaward side is exposed and visible from the water (at least at low tide). The landward side may be at least partially below ground. For example, the footing 108 may be installed in an excavated shallow cut or trench, and the volume between the landward side of the seawall 100 and the shore (at ground height) may be backfilled with soil, gravel, or the like. Backfill may cover the landward side of the seawall 100 to a desired height.

In the depicted embodiment, the tee beams 106 that form the landward face of the wall 100 are shorter than the tee beams 110 that form the seaward face of the wall 100. Tee beams 106, 110 (e.g., single-tee and/or double-tee beams) may be precast for multiple walls in the same casting bed, and may have thus have a standardized or uniform exterior finish or texture rather than a particular exterior finish or texture desired for one of the walls. Thus, in the depicted embodiment, the double-tee beams 106 at the landward side are short so as to be at or below the eventual elevation of backfill material, without being visible from the landward side, and an upper portion 104 of the wall 100 is cast-in-place concrete.

The upper portion 104 of the wall 100, in the depicted embodiment, is disposed above the tee beams 106 forming the landward face of the wall 100 and behind (to the landward side of) the tee beams 110 forming the seaward face of the wall 100. An upper portion 104 of the wall 100, above the interior fill 112 and the landward tee beams 106, may be cast-in-place concrete. For example, a form for casting concrete may be affixed to the beams 106 at the landward side, and the upper portion 104 may be cast in place between the forms and the taller seaward tee beams 110. Casting an upper portion 104 of a wall 100 in place may allow a desired exterior finish or texture to be formed on the visible upper portion 104 of the wall 100.

One or more wave deflectors 102 may be disposed at the top of the wall 100, above the tee beams 106, 110. In various embodiments, wave deflector(s) 102 may be concrete components that are shaped, curved, or angled to deflect water, to prevent waves from overtopping the wall 100. In some embodiments, wave deflectors 102 may be precast concrete components. In another embodiment, wave deflectors 102 may be cast in place with the upper portion 104 of the wall 100. In some embodiments, precast concrete wave deflectors 102 may be coupled to post-tensioning steel (e.g., threadbar 114) that secures one or more of the tee beams 110 to the footing 108. For example, multi-wire strand or threadbar 114 may extend through a tee beam 110 from an anchorage in the footing 108 to an anchorage at the top of the tee beam 110, and may be post-tensioned prior to placing the interior fill 112. The anchorage at the top of the tee beam 110 may be include or be coupled to a mounting point where a steel component (e.g., threadbar) within the wave deflector 102 may be mounted to the top of the wall 100. For example, in the depicted embodiment where a tee beam 110 is post-tensioned using threadbar 114, a threadbar-to-threadbar coupler may be disposed at the top of the threadbar 114 as a mounting point for coupling threadbar in a wave deflector 102 to the wall 100. In another embodiment, where a tee beam 110 is post-tensioned using multi-wire steel strand, a strand-to-threadbar coupler as disclosed in the incorporated patent application may optionally be disposed at the top of the strand as a mounting point for coupling threadbar in a wave deflector 102 to the wall 100.

Figure 2:
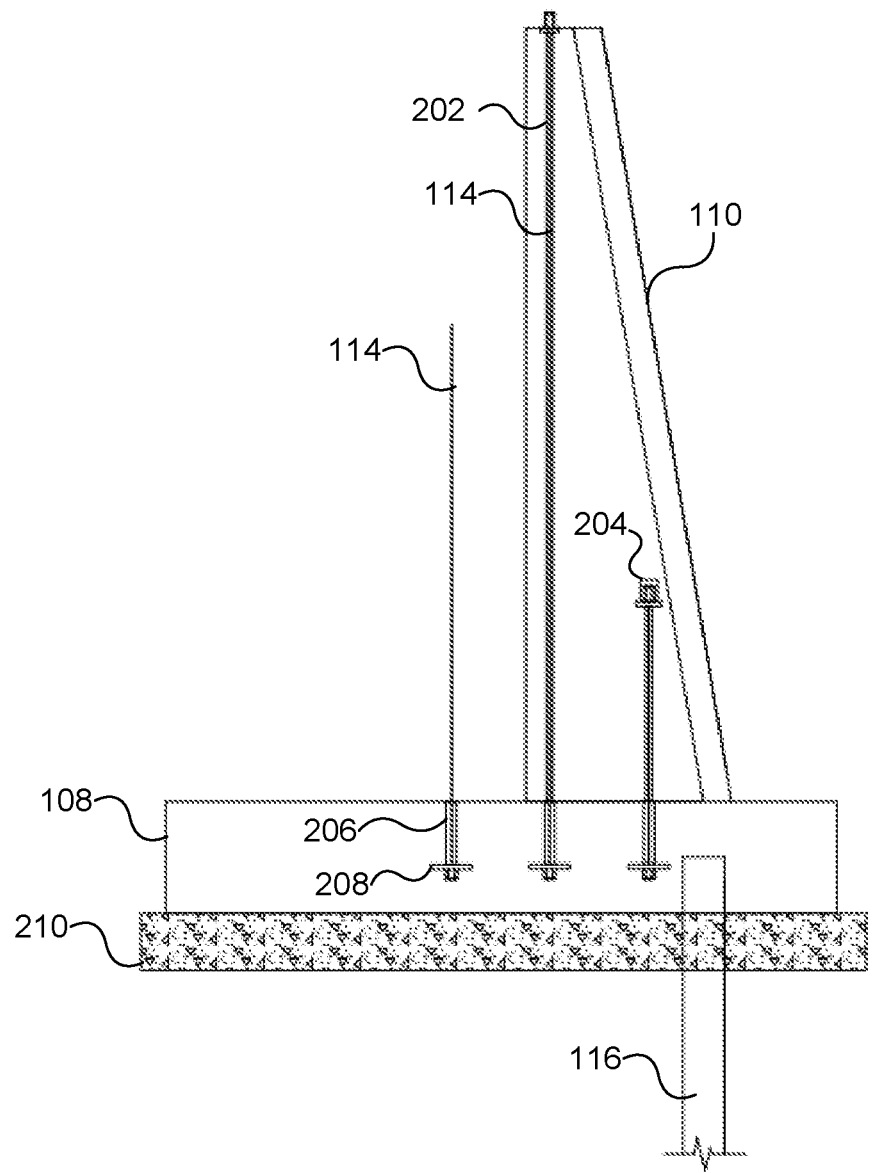
FIG. 2 is a cross section view illustrating the seawall of FIG. 1 at one stage of construction.
Figure 3:
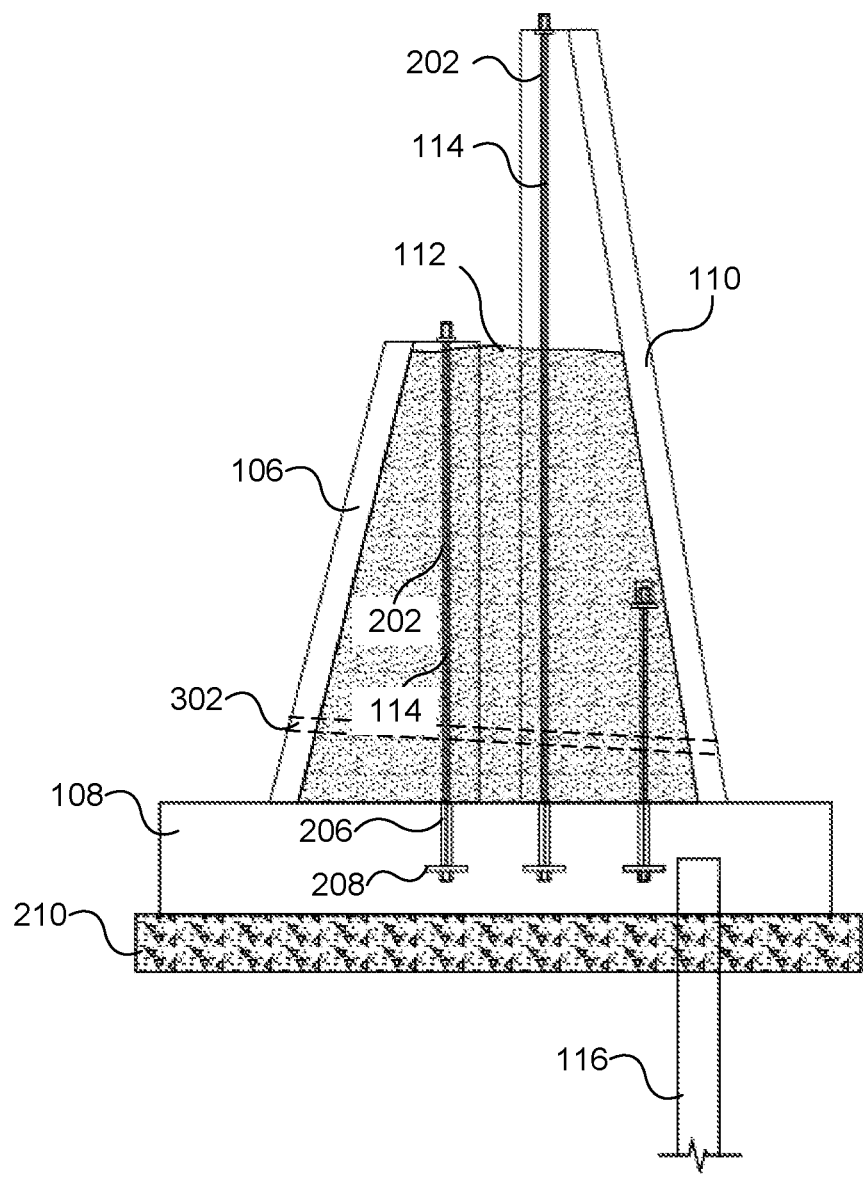
FIG. 3 is a cross section view illustrating the seawall of FIG. 1 at a subsequent stage of construction.
Figure 4:
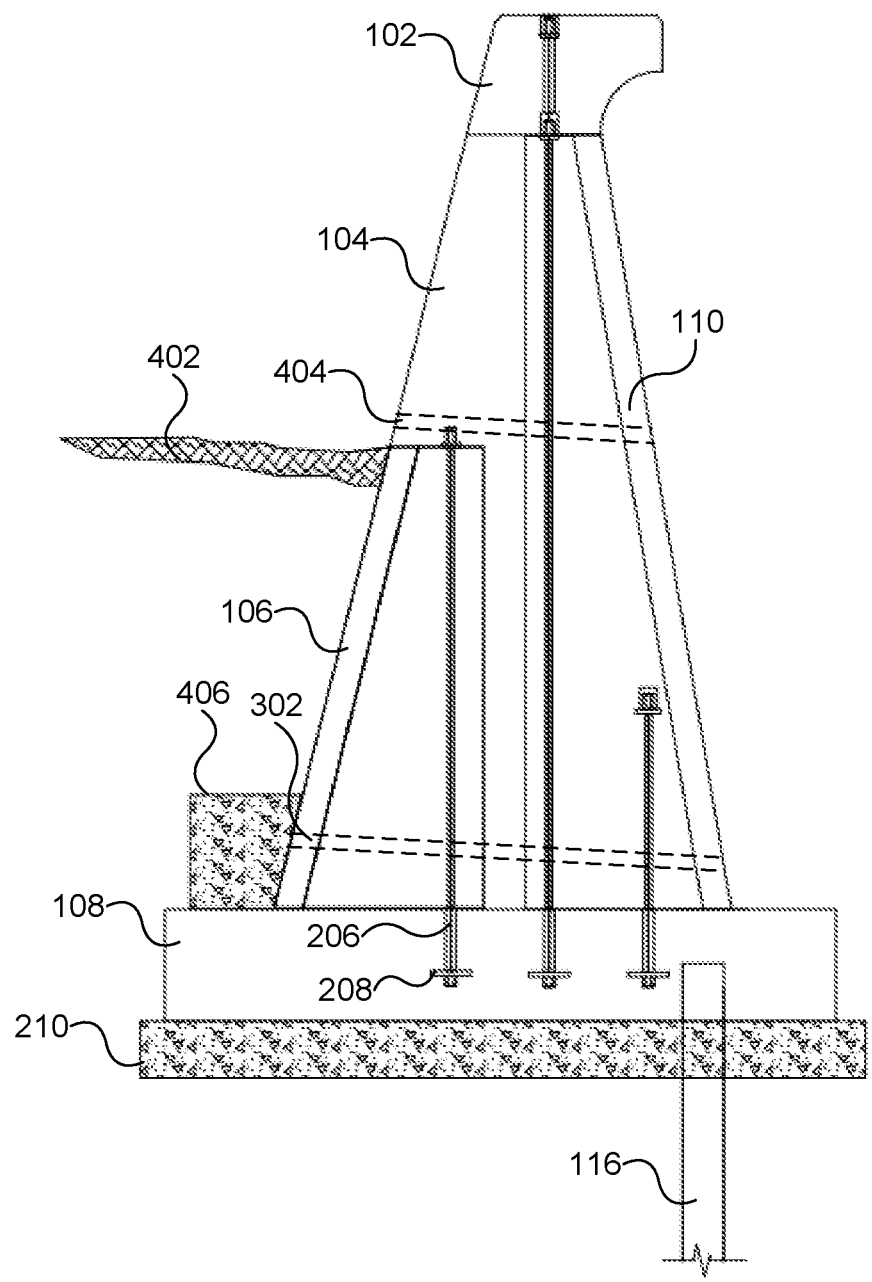
FIG. 4 is a cross section view illustrating the seawall of FIG. 1 at a subsequent stage of construction.

FIGS. 2-4 depict the seawall 100 of FIG. 1 in cross section, at three successive stages of construction. The seaward side is to the right, and the landward side is to the left. Referring to FIG. 2, the sheet-pile cut-off wall 116 is provided, and a crushed stone layer 210 is provided as a base for the footing 108. The footing 108 is cast in place, including a plurality of lower anchorages 208 and ducts 206 for threadbar 114 (or multi-wire strand). Threadbars 114 are inserted through the ducts 206 and coupled to the lower anchorages 208. Seaward tee beams 110 include ducts 202 for sleeved or bare threadbar 114 (or multi-wire strand), similar to the ducts 206 in the footing 108. The seaward tee beams 110 are lowered onto the threadbars 114 so that the threadbars 114 are in the ducts 202. Upper anchorages for the threadbars 114 are disposed at tops of the stems of the tee beams 110, and are coupled to the threadbars 114. The threadbars 114 are post-tensioned at the upper anchorage, to compress and strengthen the seaward tee beams 110. For example, nuts at the upper anchorages may be torqued to tension the threadbars 114 between the upper and lower anchorages. In some embodiments, the seaward tee beams 110 may be formed with access voids 204 to allow post-tensioning of shorter threadbars 114 that do not extend all the way to the top of the wall 100.

Referring to FIG. 3, the landward tee beams 106 include ducts 202 similar to the ducts 202 in the seaward tee beams 110. The landward tee beams 106 are coupled to the footing 108 and compressed via post-tensioning of threadbar 114 as described above for the seaward tee beams 110. Drains 302 (e.g., PVC pipe) may be included allowing water (e.g., from waves that overtop the wall 100) to drain from the landward side back to the seaward side. With the tee beams 106, 110 and the drains 302 placed, the interior fill 112 may then be added. In the depicted embodiment, the interior fill 112 is cast-in-place concrete, poured and cast into the space between the landward tee beams 106 and the seaward tee beams 110. In another embodiment, interior fill 112 may be vibration-compacted gravel, or other fill material, disposed in the space between the landward tee beams 106 and the seaward tee beams 110.

Referring to FIG. 4, once the interior fill 112 (not shown in FIG. 4) is placed to approximately the top elevation of the landward tee beams 106, upper drains 404 (e.g., PVC pipe similar to the drain 302) may be placed, and the upper portion 104 of the wall 100 may be cast in place (e.g., using forms on the landward side). Wave deflectors 102 may then be coupled to the upper portion 104 of the wall 100, the threadbars 114, and/or the seaward tee beams 110. At the lower drains 302, "burrito drain" inlets 406 may be provided including perforated tubing wrapped in cloth or another textile to let water in but keep dirt out, surrounded by a water-permeable crushed rock bed. Fill material 402 may then be added to backfill the landward side of the wall 100.

In the depicted embodiment, the drains 302, 404 extend through the wall 100, and are sloped to drain water from the landward side of the wall 100 to the seaward side. The drains may be placed before the interior fill 112 and/or the cast-in-place upper portion 104 of the wall 100 so that they slope through the interior fill 112 and/or the cast-in-place upper portion 104. One or more upper drains 404 may include inlets that are disposed above a soil level at the landward face of the wall 100. For example, in the depicted embodiment, upper drain 404 has an inlet above the level of fill material 402. One or more lower drains 302 may include filtered inlets 406 disposed below soil level (e.g., below the level of fill material 402). Filtered inlets 406 may be textile-covered perforated tube "burrito-drain" inlets as described above, or may include another type of filter to exclude the soil or fill material 302 from the lower drains 302. In various embodiment, providing drains 302, 404 above and below the soil level may mitigate erosion, by allowing water from waves that overtop the wall 100 to rapidly drain out through the upper drains 404, while allowing remaining water that seeps into the soil to drain out through the lower drains 302.

In some embodiments, drains 302, 404 may be omitted. Various other or further ways of allowing water to drain may be provided in various embodiments. For example, if interior fill 112 is free-draining fill that allows water to pass through it, filter fabric may be installed at vertical joints between adjacent tee beams 106, 110, allowing water to drain through the wall by passing through the vertical joints and the interior fill 112.

Figure 5:
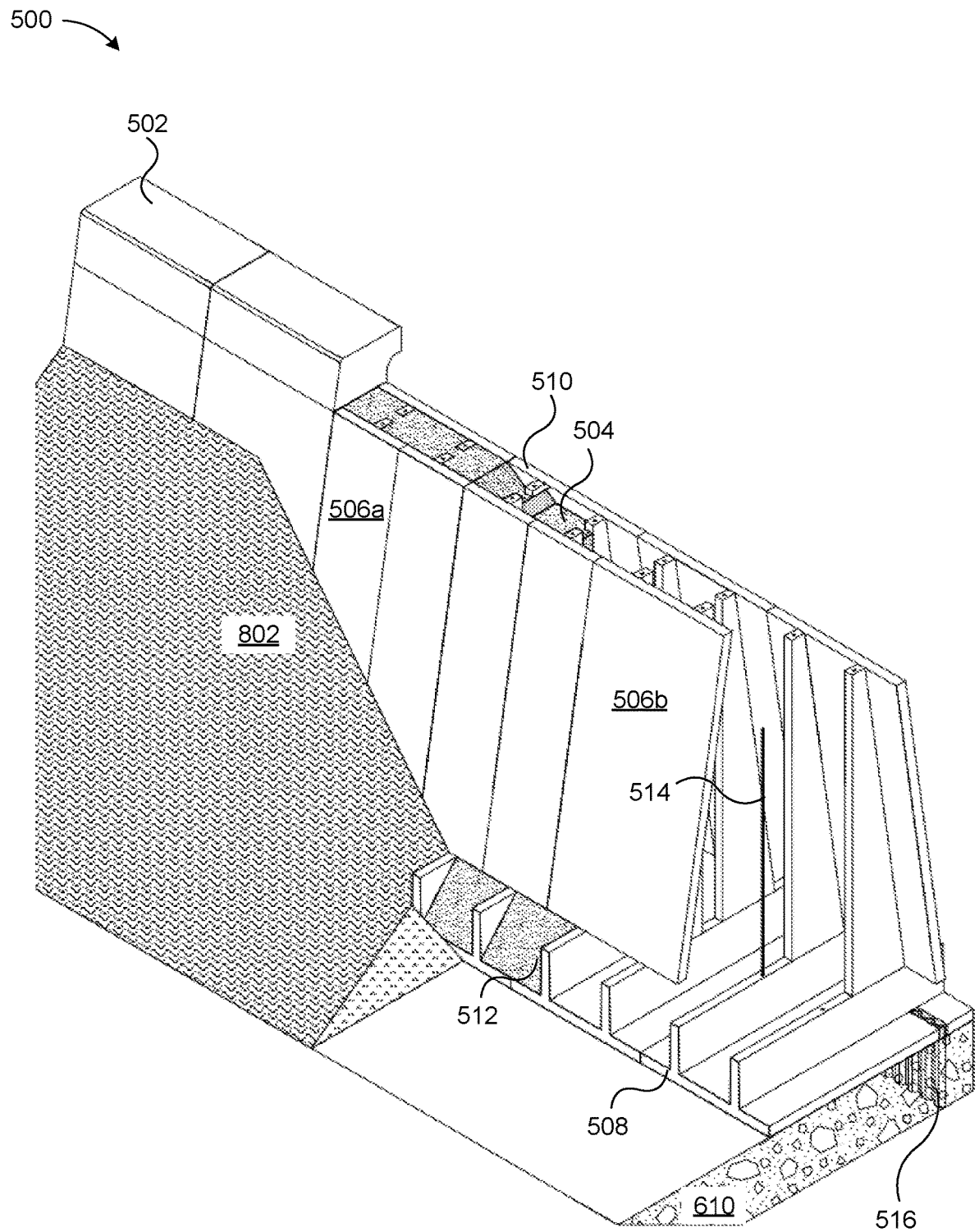
FIG. 5 is a perspective view illustrating another embodiment of a seawall under construction.
Figure 6:
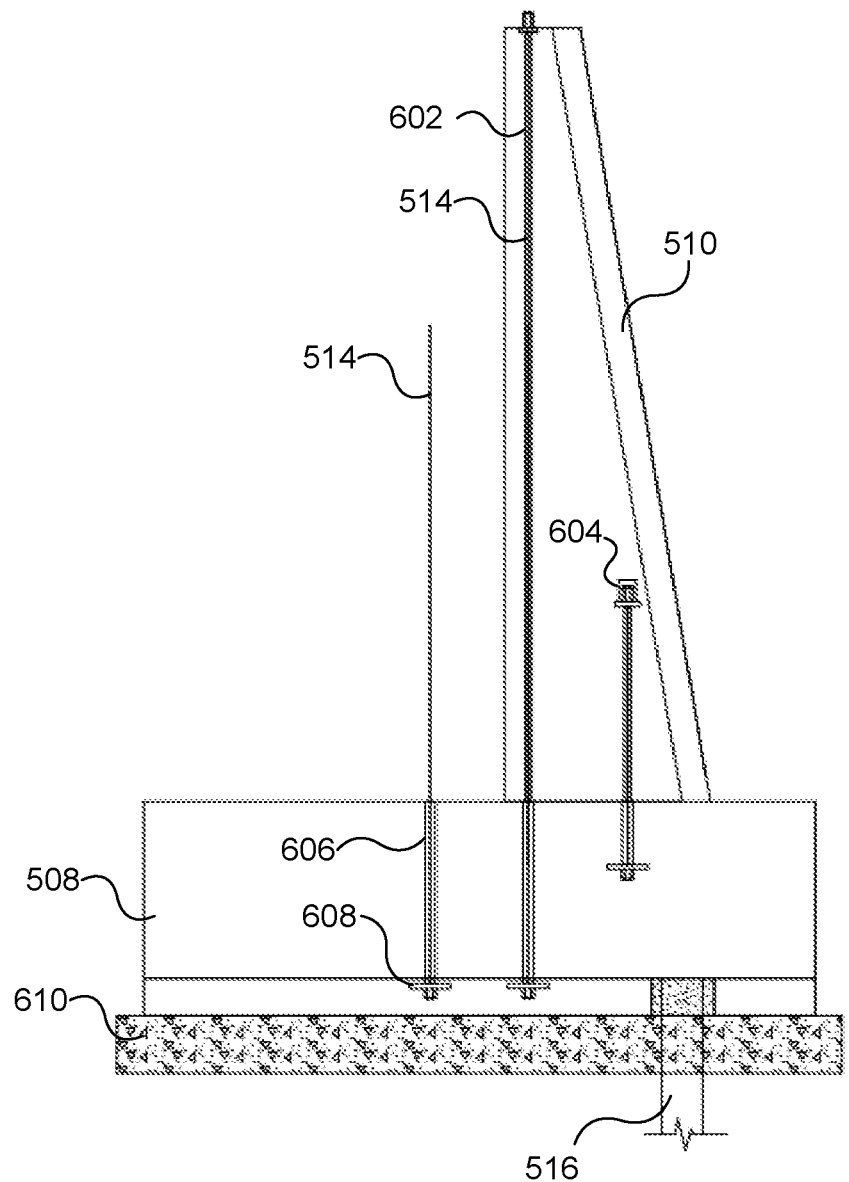
FIG. 6 is a cross section view illustrating the seawall of FIG. 5 at one stage of construction.
Figure 7:
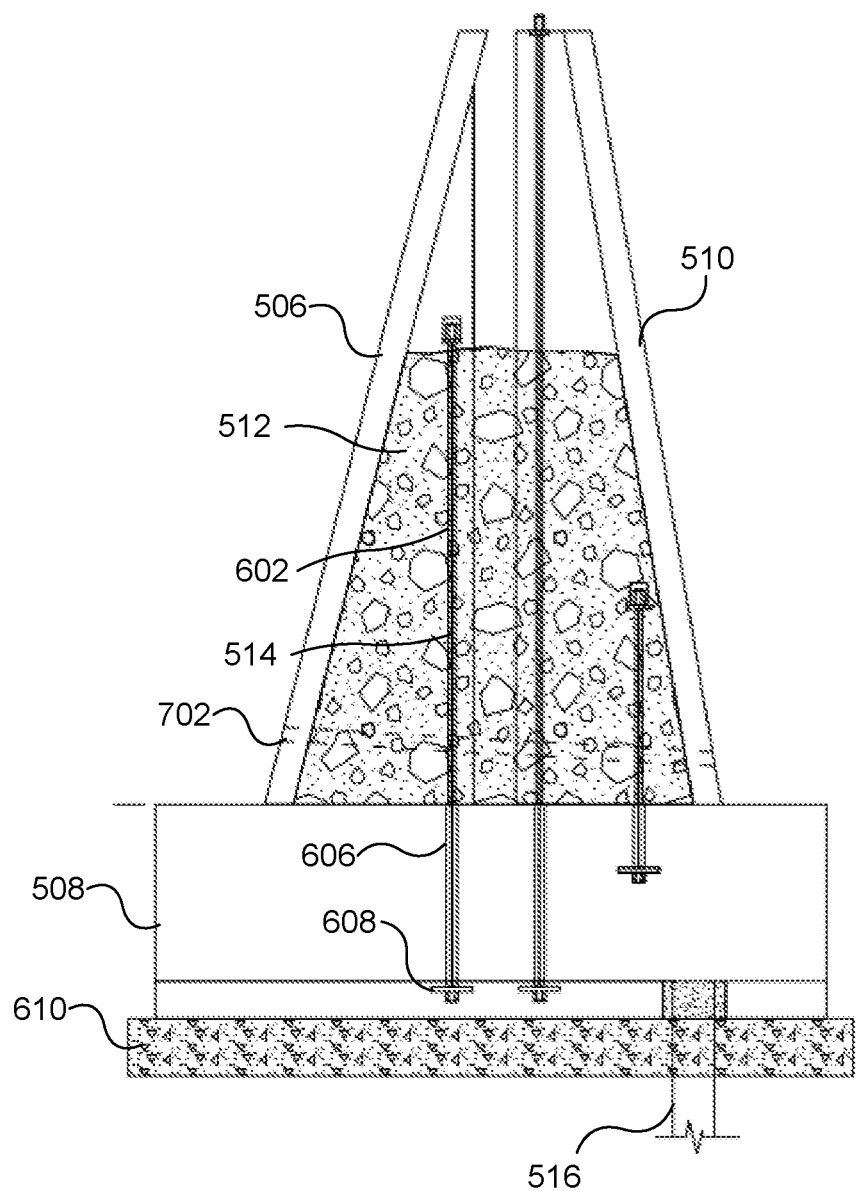
FIG. 7 is a cross section view illustrating the seawall of FIG. 5 at a subsequent stage of construction.
Figure 8:
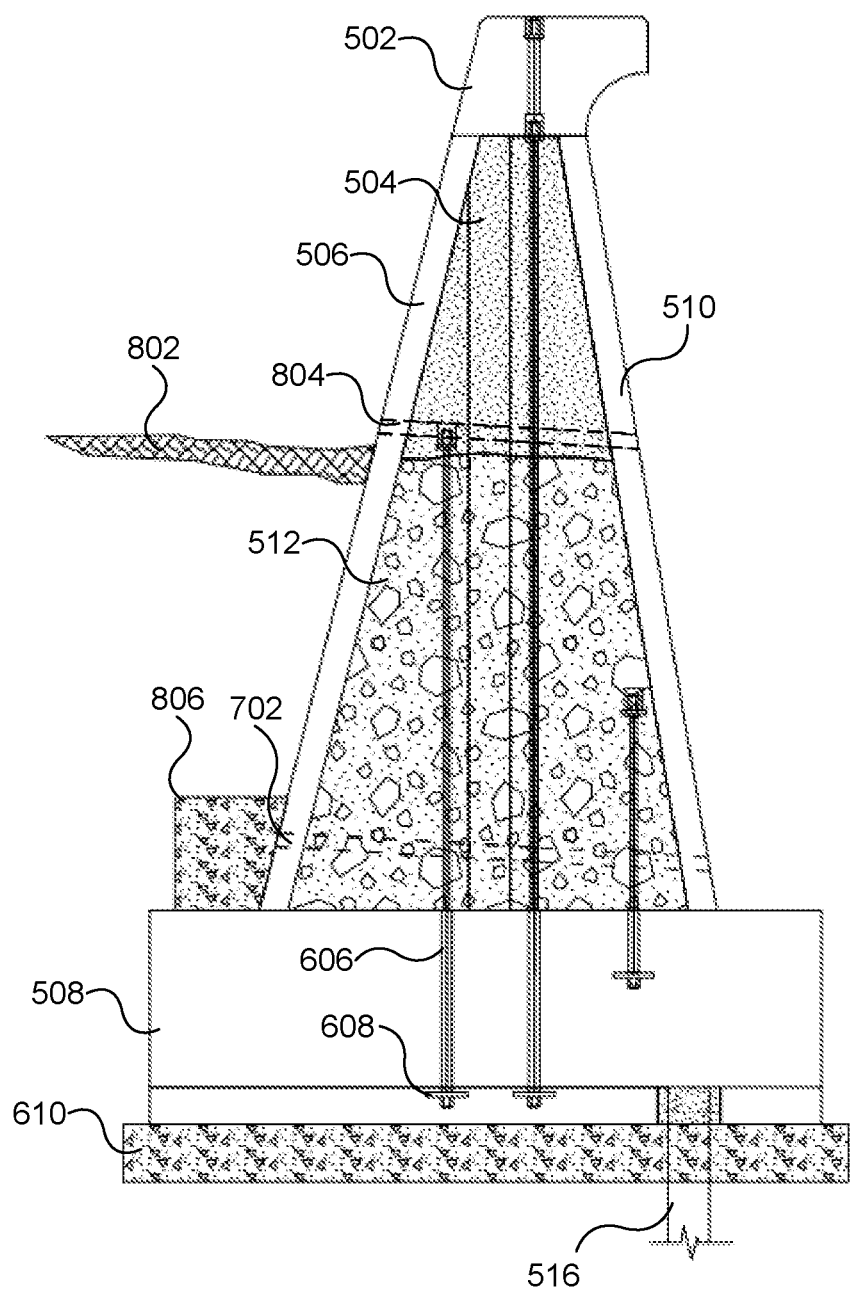
FIG. 8 is a cross section view illustrating the seawall of FIG. 5 at a subsequent stage of construction.

FIGS. 5-8 depict another embodiment of a seawall 500. FIG. 5 depicts the seawall 500 in a perspective view, with FIGS. 6-8 depicting cross sections of the seawall 500 at different stages of construction. As in FIGS. 1-4, the seaward side is depicted to the right (or, in the perspective view, to the upper right), and the landward side is depicted to the left (or, in the perspective view, to the lower left). The seawall 500, in the depicted embodiment, may be substantially similar to the seawall 100 described above with reference to FIGS. 1-4, including wave deflectors 502, a cast-in-place upper portion 504, landward tee beams 506, a footing 508, seaward tee beams 510, interior fill 512, threadbar 514, a sheet pile cut-off-wall 516, a crushed stone layer 610, threadbar anchorages 608, ducts 602, 606, access voids 604, drains 702, 804, "burrito drain" inlets 806 and fill material 802, which may be substantially as described above apart from certain differences which are described below.

Referring to FIG. 5, the footing 508 in the depicted embodiment comprises precast concrete tee beams, which may be single-tee beams, double-tee beams, or the like as described above with reference to tee beams 106, 110. The tee beams for the footing 508 may be cast with a void in the flange to admit the top end of the sheet pile cut-off wall 516. In some embodiments, a footing 508 made of precast concrete tee beams may be constructed more quickly than the cast-in-place footing 108 described above with reference to FIG. 1.

In the depicted embodiment, the landward tee beams 506 are a mixture of single-tee beams 506a and double-tee beams 506b. In various embodiments, the landward tee beams 506 and/or the seaward tee beams 510 may include single-tee beams, double-tee beams, or a mixture of single- and double-tee beams. In some embodiments, single-tee beams may be used where a larger double-tee beam would be difficult to place, or to facilitate alignment deviations where the wall 500 changes direction.

The tee beams 506 forming the landward face of the wall 100, in the depicted embodiment, are equal in height to the tee beams 510 forming the seaward face of the wall 100. Equal height tee beams 506, 510, in various embodiments, may be formed in the same or substantially similar beds or molds to be the same nominal height (apart from differences that arise in casting, or may be substantially the same height allowing for some variation or tolerance (e.g., a 1% variation in height, a 2% variation in height, a 5% variation in height) such that beams within the tolerance can still be described as equal in height. With the landward tee beams 506 in the depicted embodiment extending to the same height as the seaward tee beams 510, the landward tee beams 506 are visible above the fill material 802. In some embodiments, using equal-height landward and seaward tee beams 506, 510 may allow cast-in-place portions of the wall 500 such as the upper portion 504 to be cast between the landward and seaward tee beams 506, 510 instead of by using a form at the landward side. However, exterior finish options may be more limited when using landward tee beams 506 that are visible above the fill material 802.

The interior fill 512, in the depicted embodiment, is vibration-compacted crushed rock, or a self-compacting rock fill. For example, interior fill 512 may be three-quarter inch minus crushed rock. Fill material that is more flowable than crushed rock or self-compacting rock, such as concrete interior fill 112 or lightweight cellular concrete, may be used with a cast-in-place footing 108, but excess concrete may run out between the stems of precast double-tees in footing 508. If concrete or lightweight cellular concrete is used as interior fill 512, drains 702, 804 may be included to facilitate drainage through concrete interior fill 512. Alternatively, once a sufficient amount of free-draining interior fill 512 such as crushed rock has been placed and compacted, an upper portion 504 of the wall 500 may be cast in place above the interior fill 512, between the tee beams 506, 510.

FIGS. 6-8 depict the seawall 500 of FIG. 5 in cross section, at three successive stages of construction. Referring to FIG. 6, the sheet-pile cut-off wall 516 is provided, and a crushed stone layer 610 is provided as a base for the tee beams of the footing 508. The tee beams are precast concrete with a plurality of lower anchorages 608 and ducts 606 for threadbar 514 (or multi-wire strand). The tee beams for the footing 508 are cast with a void in the flange, and are positioned so that the void admits the top end of the sheet pile cut-off wall 516. With the tee beams for the footing 508, the seaward tee beams 510 are coupled to the footing 508 and compressed via post-tensioned threadbar 514 as described above with reference to FIG. 2.

Referring to FIG. 7, the landward tee beams 506 are similarly coupled to the footing 508 and compressed via post-tensioned threadbar 514. Drains 702 are placed, and the crushed rock for the interior fill 512 is added between the beams 506, 510, and compacted. Referring to FIG. 8, upper drains 806 are placed, and the concrete (or similar material) to form the upper portion 504 of the wall 500 is cast in place between tee beams 506, 510. The upper portion 504 is confined to the interior of the wall 500 between tee beams 506, 510, and may thus be cast without building additional forms on either side of the wall 500. The upper portion 504 may be cast from a flowable material such as concrete, cellular concrete, or grout. Wave deflectors 502 are coupled to the upper portion 504 of the wall 500, the threadbars 514, the landward tee beams 506 and/or the seaward tee beams 510. "Burrito drain" inlets 804 are coupled to the lower drains 702, and fill material 802 is added to backfill the landward side of the wall 500.

Figure 9:
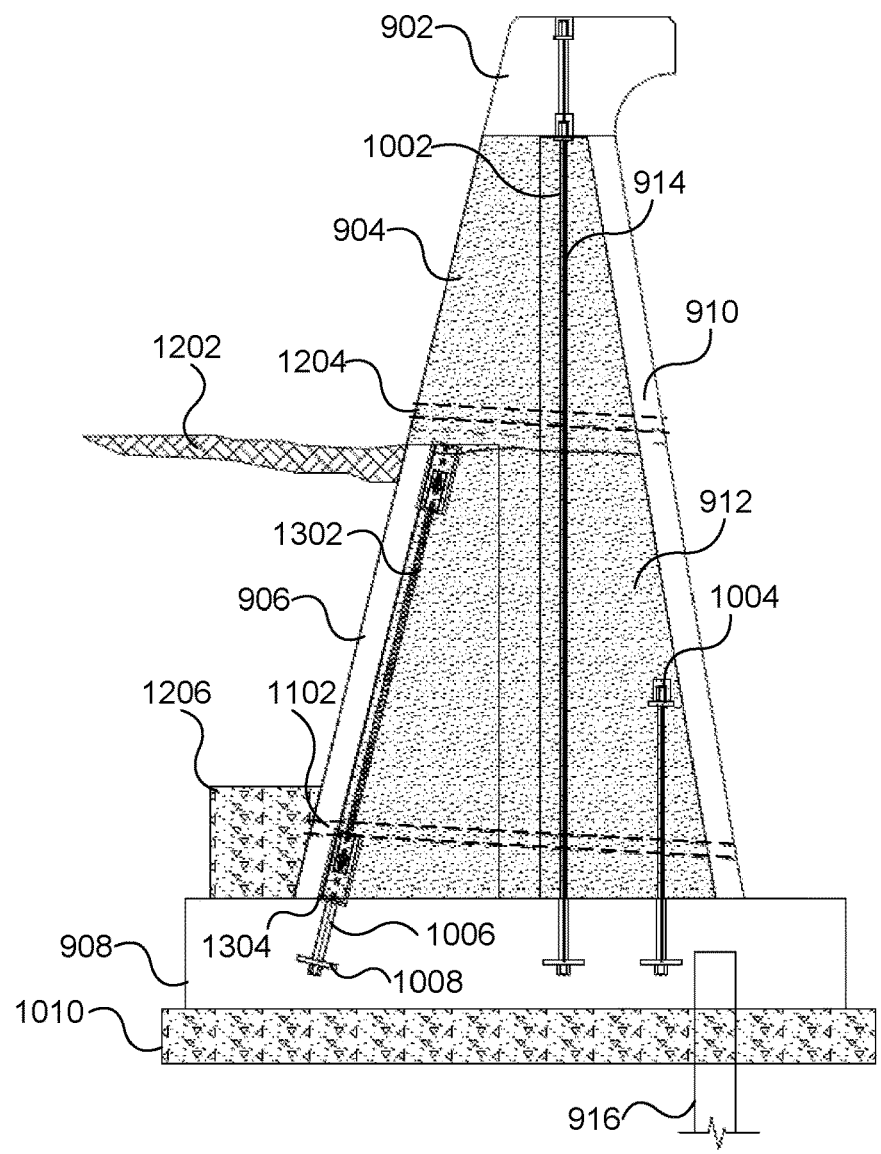
FIG. 9 is a cross section view illustrating another embodiment of a seawall.

FIG. 9 depicts another embodiment of a seawall 900 in cross section, at a completed stage of construction similar to FIGS. 4 and 8. As in FIGS. 4 and 8 the seaward side is depicted to the right, and the landward side is depicted to the left. The seawall 900, in the depicted embodiment, may be substantially similar to the seawalls 100, 500 described above with reference to FIGS. 1-8, including wave deflectors 902, a cast-in-place upper portion 904, landward tee beams 906, a footing 908, seaward tee beams 910, interior fill 912, threadbar 914, a sheet pile cut-off-wall 916, a crushed stone layer 1010, threadbar anchorages 1008, ducts 1002, 1006, access voids 1004, drains 1102, 1204, "burrito drain" inlets 1206 and fill material 1202, which may be substantially as described above. Additionally, in the depicted embodiment, the wall 900 includes multi-wire strand 1302 coupled to threadbar by a coupler 1304, as described below.

In various embodiments, post-tensioning steel for tee beams 906, 910 may be multi-wire strand 1302 and/or threadbar 914. In various embodiments, post-tensioning steel may be vertical, angled at the same angle as the flanges of tee beams 906, 910, and/or angled at a different angle than the flanges of tee beams 906, 910. In the depicted embodiment, post-tensioning steel for seaward tee beams 910 is vertical threadbar 914, and post-tensioning steel for landward tee beams 906 is multi-wire steel strand 1302, angled at the same angle as the flange of the landward tee beams 906.

With the fill material 1202 impinging on the landward tee beams 906, soil pressure on the exterior of the flanges for the tee beams 906 may cause or tend to cause deflection, resulting (in the absence of post-tensioning) in tension on the interior face of the flanges, which may weaken the landward tee beams 906. Thus, in the depicted embodiment, providing post-tensioning steel angled at the same angle as the flanges for landward tee beams 906 may result in the entire flange being in compression. An anchorage 1008 and duct 1006 are disposed in the footing 908 at the desired angle. A short piece of threadbar is coupled to the anchorage 1008 and extends out through the duct 1006 to provide an attachment point for multi-wire strand 1302.

A strand-to-threadbar coupler 1304 (as disclosed in the incorporated patent application referred to above) may include a threadbar nut coupled to the exposed threadbar, and a strand chuck to which the strand 1302 is coupled. The strand 1302 is coupled to an anchorage at the top of the tee beam 906, and is tensioned between the lower coupler 1302 and the upper anchorage. Tension may be applied at the anchorage and/or at the coupler 1302 (e.g., by torquing the threadbar nut before the interior fill 912 is placed). In various embodiments, various other or further anchorages, couplers, and/or tensioning devices or methods may be used to install and tension multi-wire steel strand 1302.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seawall comprising:
a concrete footing;
a plurality of precast concrete tee beams comprising one or more of single-tee beams and double-tee beams, wherein flanges of the tee beams are positioned to form seaward and landward faces of a wall, wherein a bottom of the flanges of the tee beams are positioned adjacent to the footing and the footing extends across the bottom of the flanges from the seaward face to the landward face and stems of the tee beams are coupled to the footing between the seaward and landward faces; and
interior fill disposed between the seaward and landward faces.

2. The seawall of claim 1, wherein the flanges of the tee beams are positioned such that the seaward and landward faces of the wall are slanted and the wall is thicker at a base of the wall than at a top of the wall.

3. The seawall of claim 2, wherein the stems of the tee beams extend further away from the flanges of the tee beams at the base of the wall than at the top of the wall.

4. The seawall of claim 1, further comprising:
a first plurality of anchorages disposed in the concrete footing;
a second plurality of anchorages disposed at tops of the stems; and
a plurality of elongate steel components extending through the stems and tensioned between the first plurality of anchorages and the second plurality of anchorages.

5. The seawall of claim 4, wherein the elongate steel components comprise threadbar.

6. The seawall of claim 4, wherein the elongate steel components comprise multi-wire steel strand.

7. The seawall of claim 1, further comprising one or more wave deflectors disposed above the tee beams, the one or more wave deflectors comprising concrete shaped to deflect water, wherein the one or more wave deflectors are precast and the wave deflectors are anchored directly to the footing with an elongated steel component.

8. The seawall of claim 1, wherein the tee beams forming the landward face of the wall are shorter than the tee beams forming the seaward face of the wall.

9. The seawall of claim 8, wherein the tee beams landward face being shorter than the tee beams forming the seaward wall forms a gap for filling a void between the tee beams of the landward face and the tee beams of the seaward face, and further comprising an upper portion of the wall disposed above the tee beams forming the landward face of the wall and behind the tee beams forming the seaward face of the wall, the upper portion of the wall comprising cast-in-place concrete.

10. The seawall of claim 1, wherein the tee beams forming the landward face of the wall are equal in height to the tee beams forming the seaward face of the wall.

11. The seawall of claim 1, wherein the interior fill comprises one or more of:
cast-in-place concrete; and
vibration-compacted crushed rock.

12. The seawall of claim 1, further comprising a sheet pile wall extending downward from the footing to prevent erosion of soil under the footing.

13. The seawall of claim 1, wherein the footing comprises cast-in-place concrete.

14. The seawall of claim 1, wherein the footing comprises concrete tee beams.

15. The seawall of claim 1, further comprising a plurality of drains extending through the wall and sloped to drain water from a landward side to the seaward side.

16. The seawall of claim 15, wherein the plurality of drains comprises:
at least one upper drain comprising an inlet disposed above a soil level at the landward face of the wall; and
at least one lower drain comprising a filtered inlet disposed below the soil level.

17. A method comprising:
excavating a location for placing a concrete footing for a wall;
installing a sheet pile wall extending downward from the location;
installing the concrete footing at the location, the concrete footing comprising a first plurality of anchorages for threadbars;
coupling threadbars to the anchorages;
placing a plurality of precast concrete tee beams over the threadbars, the tee beams comprising one or more of single-tee beams and double-tee beams, the tee beams positioned such that the threadbars extend through stems of the tee beams, and a plurality of flanges of the tee beams are positioned to form seaward and landward faces of the wall, wherein a bottom of the flanges of the tee beams are positioned adjacent to the footing and the footing extends across the bottom of the flanges of the seaward and landward faces;
coupling a second plurality of anchorages to the threadbars above the stems of the tee beams;
tensioning the threadbars between the first plurality of anchorages and the second plurality of anchorages; and
installing interior fill between the seaward and landward faces.

18. The method of claim 17, further comprising disposing a plurality of drains extending through the interior fill between the seaward and landward faces.

19. The method of claim 17, further comprising coupling one or more precast wave deflectors to the wall above the tee beams, wherein the one or more wave deflectors are precast and the wave deflectors are coupled to the footing with an elongated steel component.

20. A seawall comprising:
a concrete footing;
a first plurality of anchorages disposed in the concrete footing;
a plurality of precast concrete tee beams comprising one or more of single-tee beams and double-tee beams, wherein flanges of the tee beams are positioned to form seaward and landward faces of a wall, wherein a bottom of the flanges of the tee beams are positioned adjacent to the footing and the footing extends across the bottom of the flanges of the seaward and landward faces and stems of the tee beams are coupled to the footing between the seaward and landward faces, wherein a top of the flanges of the seaward face of the wall extends further away from the footing than a top of the flanges of the landward face;
a second plurality of anchorages disposed at tops of the stems;
a plurality of elongate steel components extending through the stems and tensioned between the first plurality of anchorages and the second plurality of anchorages;
interior fill disposed between the seaward and landward faces;
an upper portion positioned above the tee-beams of the landward face, the upper portion extends to a top of the seaward face, wherein a face of the upper portion is in a same plane as the flanges of the tee-beams of the landward face; and
one or more wave deflectors disposed above the tee beam of the seaward face and above the upper portion, the one or more wave deflectors are precast and the wave deflectors are anchored to the footing with an elongated steel component.

* * * * *